July 11, 1967     R. P. THORN     3,330,519
VIBRATION DAMPING MOUNTING SYSTEM
Filed April 19, 1965     2 Sheets-Sheet 1
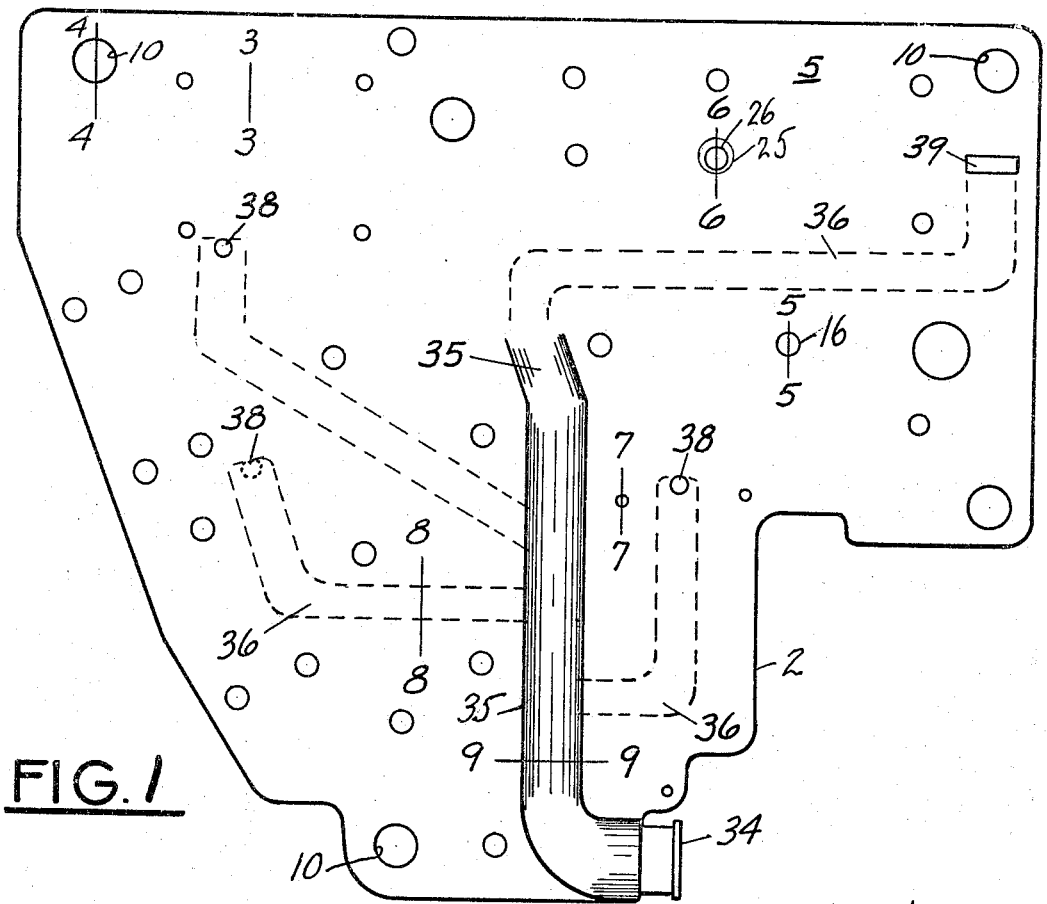
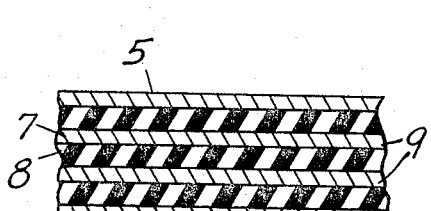
FIG. 3
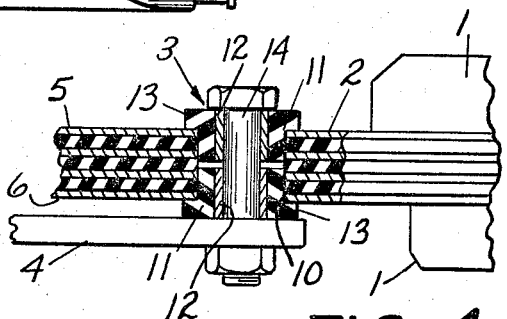
FIG. 4
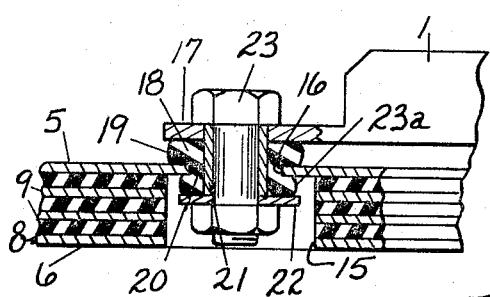
FIG. 5
INVENTOR.
Richard P Thorn
BY
Ralph Hammar
attorney July 11, 1967 — R. P. THORN — 3,330,519
VIBRATION DAMPING MOUNTING SYSTEM
Filed April 19, 1965 — 2 Sheets-Sheet 2
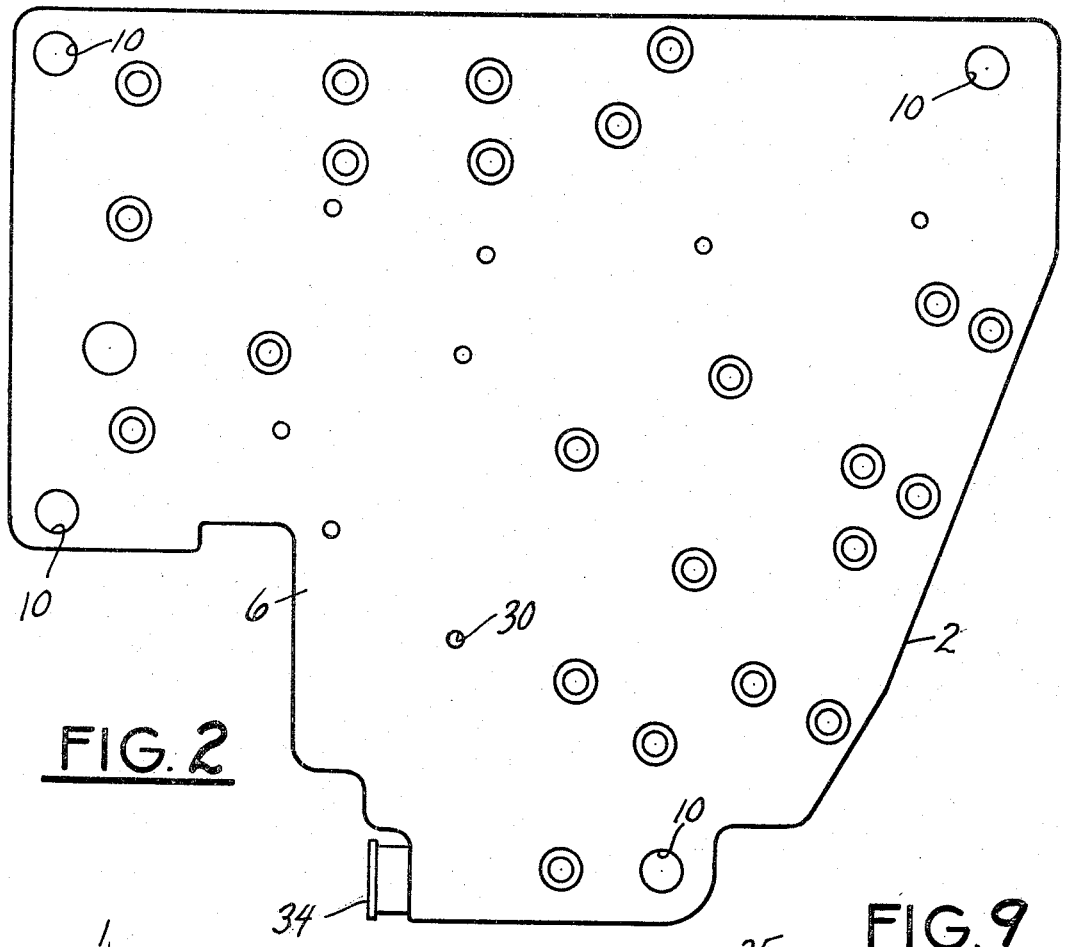
FIG. 2
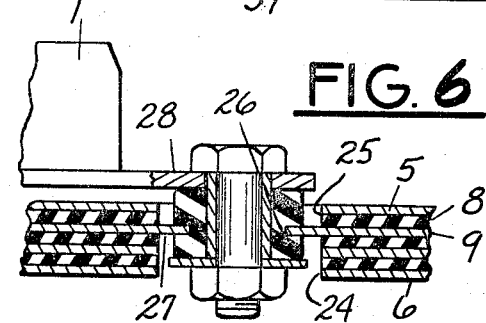
FIG. 6
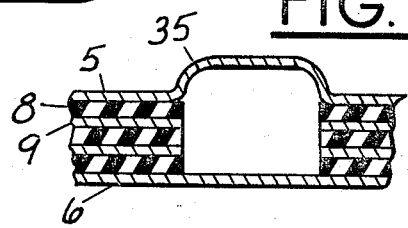
FIG. 9
FIG. 8
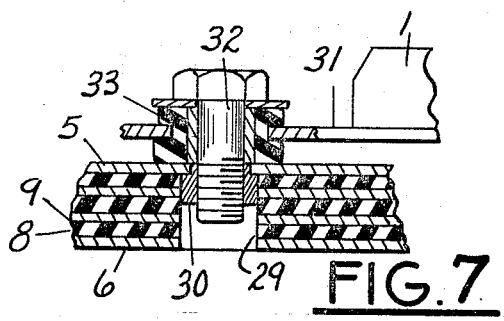
FIG. 7
INVENTOR.
Richard P. Thorn
BY Ralph Hammar
Attorney

United States Patent Office 3,330,519
Patented July 11, 1967

---

3,330,519
VIBRATION DAMPING MOUNTING SYSTEM
Richard P. Thorn, Erie, Pa., assignor to Lord Corporation, Erie, Pa., a corporation of Pennsylvania
Filed Apr. 19, 1965, Ser. No. 448,965
7 Claims. (Cl. 248—358)

This invention is a mounting system in which the supported equipment is mounted on a flexible panel of a damped laminate which materially increases the effectiveness of isolation at the higher frequencies.

In the drawing, FIG. 1 is a top plan view of the flexible panel, FIG. 2 is a bottom plan view of the panel, and FIGS. 3 to 9 inclusive are sectional views on the correspondingly numbered lines in FIG. 1.

In the drawing, 1 indicates several units of supported equipment which are mounted on opposite sides of a flexible panel 2 resiliently supported by mountings 3 on a supporting structure 4.

As shown in FIG. 3, the panel 2 comprises a multi-ply damped laminate of outer skins 5 and 6 of metal or other structural material bonded to an intermediate section of viscoelastic material which may consist of one or more layers 8 of viscoelastic material and one or more layers 9 of structural material bonded together to form the composites damped core 7 between the skins 5 and 6. The viscoelastic material 8 is characterized by a low modulus of elasticity and high internal friction or loss factor as compared to the structural material 5, 6 and 9. For properties of viscoelastic materials, see Product Engineering, Apr. 17, 1961, pages 45–56, and for a definition of loss factor, see Final Report of the ASA Committee S2–W–33 on "Damping of Materials." The structural material is inextensible as compared to the viscoelastic material so that as the composite laminate is flexed, there is relative motion between the viscoelastic and structural materials causing damping due to the hysteresis or loss factor of the viscoelastic material. In the particular structure illustrated which is intended for high temperature operation, the viscoelastic material is preferably one of the highly damped silicone elastomers which is cured and bonded to the layers 5, 6 and 9 of structural material.

At suitable locations in the panel laterally spaced from each other are cored out openings 10 for mountings resiliently supporting the panel on the supporting structure 4. These mountings (FIG. 4) comprise elastomeric bushings 11 bonded or otherwise fixed to center sleeves 12 and fitting into the openings 10 from opposite sides. Each of the bushings has a flange 13 overlying the adjacent outer surface of the panel. A through bolt 14 tightens the sleeves solidly in end to end relation fixing the sleeves and bolt in rigid relation to the supporting structure 4 and positioning the bushings 11 within the openings 10 to provide a vibration isolating connection between the panel 2 and the supporting structure 4. The vibration isolation is effective in all positions of the panel, upright, inverted, horizontal, vertical or inclined.

The units of supported equpment 1 diagrammatically shown in FIGS. 4, 5, 6, 7 may be mounted on one or on both faces of the panel 2. FIGS. 5, 6 and 7 show several structures for mounting one of the units of equipment 1 each located as shown in FIG. 1 on a section or span of the panel laterally spaced from the bushings. In FIG. 5 there is a cored out opening 15 in the skin 6 and in the layers 8, 9, the opening 15 being concentric with and of larger diameter than an opening 16 in the skin 5. The supported equipment 1 has a bracket 17 mounted on the skin 5 by means of a resilient mounting such as, for example, that shown in Patent 2,828,095, having a bushing 18 of elastomer with a flange 19 overlapping the skin 5 and a body 20 projecting through the opening 16. At the center of the body 20 is a metal sleeve 21 which is clamped between the bracket 17 and a washer 22 by a through bolt 23. When the bolt is tightened, the lower end of the body 20 is expanded to bulge outward at 23a and grip the under surface of the skin 5. By connecting the equipment 1 to the skin 5, the resilience of the panel 2 is interposed between the supporting structure and the resilient mounting introducing additional vibration isolation, particularly at the higher frequencies. The hysteresis or internal damping of the elastomer 8 limits the amplitude of vibration at resonance conditions.

FIG. 6 shows a modification in which there are cored out openings 24 and 25 extending respectively through the skins 6 and 5 concentric with a smaller diameter opening 26 in one of the intermediate layers 27 of structural material. The unit of supported equipment 1 has a bracket 28 which is mounted to the structural layer 27 by the same mounting shown in FIG. 5. The mounting of FIG. 6 takes advantage of the resilience of the panel 2 and of its damping properties and provides somewhat better isolation because connection to the outer skins 5, 6 is eliminated.

In the structure of FIG. 7, there is a cored out opening 29 extending through the skin 6 and through intermediate layers 8, 9 and concentric with a nut 30 fixed to the skin 5. The unit of supported equipment 1 has a bracket 31 which may be bolted solidly to the skin 5 by a bolt 32 if additional vibration isolation is not required, or which may be connected to the skin 5 by a resilient mounting 33 of the same type as that shown in FIG. 5.

In addition to providing vibration isolation, the panel also provides cooling air for the supported equipment. In FIG. 1 there is shown the inlet 34 of a cooling air duct which is built in between the skins 5 and 6. Depending upon the volume of cooling air required, one or both of the skins may have a raised section 35 which will increase the cross-sectional area of the duct. Branching from the duct are a plurality of ducts 36 formed by cutting registering openings 37 in the layers 8, 9 before bonding to the outer skins 5 and 6. The openings 37 are preferably cut out before curing, and the individual sheets 8, 9 are then stacked one on top of the other with the cut out openings 37 in register and sandwiched between and bonded to the outer skins 5, 6. Holes 38 may be drilled in either the skin 5 or the skin 6 to discharge cooling air adjacent particular pieces of mounted equipment or a hole 39 may be formed in one or in both skins 5, 6 to serve as an outlet. The drilling of the holes 38 permits tailoring of the cooling air to the requirements of the mounted equipment. Usually the outlet opening such as 39 is not necessary since sufficient cooling air is exhausted through the drilled holes 38.

The more rugged units of equipment are bolted solidly to one of the skins 5, 6 and are protected by the resilience of the mountings 11–14 and by the resilience of the panel 2. The less rugged units have the additional protection of mountings 18–23a (FIG. 5) or the like (FIGS. 6, 7). The viscoelastic layers 8 dampen vibration of the panel and thereby reduce resonance amplitudes.

This is an improvement on application Ser. No. 172,-441, filed Feb. 12, 1962, now U.S. Patent No. 3,193,236.

What is claimed as new is:

1. A mounting system comprising supporting and supported members, a flexible panel of a damped laminate, means for resiliently mounting the panel on the supporting member positioned so the panel has a substantial section laterally spaced from the resilient means, said panel comprising a core of viscoelastic material sandwiched between and bonded to spaced layers of structural material, said viscoelastic material being characterized by a low modulus of elasticity and a high internal friction or loss factor as compared to said structural material, a plurality of openings in said section, resilient means in each opening in load carrying relation between the supported member and one of said layers and including a connection to said one layer in said section of the panel, the other of said layers being spaced out of contact with said connection.

2. A mounting system comprising supporting and supported members, a flexible panel of a damped laminate, means for resiliently mounting the panel on the supporting member positioned so the panel has a substantial section laterally spaced from the resilient means, said panel comprising a core of viscoelastic material sandwiched between and bonded to spaced layers of structural material, said viscoelastic material being characterized by a low modulus of elasticity and a high internal friction or loss factor as compared to said structural material, said viscoelastic material having bonded therein at least another layer of structural material, a plurality of openings in said section, resilient means in each opening in load carrying relation between the supported member and one of said layers of structural material and including a connection to said one layer in said section of the panel, the other of said layers being spaced out of contact with said connection.

3. A mounting system comprising supporting and supported members, a flexible panel of a damped laminate, means for resiliently mounting the panel on the supporting member positioned so the panel has a substantial section laterally spaced from the resilient means, means for mounting the supported member on said section of the panel, said panel comprising a core of a plurality of layers of viscoelastic and structural material sandwiched between and bonded to spaced outer layers of structural material, said viscoelastic material being characterized by a low modulus of elasticity and a high internal friction or loss factor as compared to said structural material, the layers of said core having registering openings therein transverse to the thickness thereof and defining a passageway leading between said outer layers of structural material, and an inlet to and an outlet from said passageway.

4. A mounting system comprising supporting and supported members, a flexible panel, means for resiliently mounting the panel on the supporting member, means for mounting the supported member on the panel, said panel comprising a core of a plurality of layers of viscoelastic and structural material sandwiched between and bonded to spaced outer layers of structural material, the layers of said core having registering openings therein transverse to the thickness thereof and defining a passageway leading between said outer layers of structural material, an inlet to said passageway for cooling air, and a hole in at least one of said outer layers forming an outlet from the passageway for directing cooling air against the supported member.

5. A mounting system comprising supporting and supported members, a flexible panel, means for resiliently mounting the panel on the supporting member, said panel comprising a core of viscoelastic material sandwiched between and bonded to spaced layers of structural material, a plurality of mounting structures for a supported member on each of the layers, each mounting structure comprising resilient means in load carrying relation between the supported member and one of said layers and including a connection to said one layer, the other of said layers being spaced out of contact with said connection.

6. A mounting system comprising supporting and supported members, a flexible panel of a damped laminate, means for resiliently mounting the panel on the supporting member positioned so the panel has a substantial section laterally spaced from the resilient means, said panel comprising a core of a plurality of layers of viscoelastic and structural material sandwiched between and bonded to spaced outer layers of structural material, said viscoelastic material being characterized by a low modulus of elasticity and a high internal friction or loss factor as compared to said structural material, the layers of said core having registering openings therein transverse to the thickness thereof and defining a passageway leading between said outer layers of structural material, an inlet to and an outlet from said passageway, resilient means in load carrying relation between the supported member and one of said layers of structural material and including a connection to said one layer in said section of the panel, the other of said layers of structural material being spaced out of contact with said connection.

7. A mounting system comprising supporting and supported members, a flexible panel, means for resiliently mounting the panel on the supporting member, said panel comprising a core of a plurality of layers of viscoelastic and structural material sandwiched between and bonded to spaced outer layers of structural material, the layers of said core having registering openings therein defining a passageway leading between said outer layers of structural material, a plurality of resilient means each in load carrying relation between a supported member and one of the layers of structural material and including a connection to said one layer, the other of said layers of structural material being spaced out of contact with said connection, an inlet to said passageway for cooling air, and a hole in one of said outer layers for directing cooling air against a supported member.

References Cited
UNITED STATES PATENTS

| | | | |
|---|---|---|---|
| 2,271,016 | 1/1942 | Julien | 248—9 |
| 2,828,095 | 3/1958 | Beck et al. | 248—9 |
| 3,020,856 | 2/1962 | Hirst | 267—63 X |
| 3,078,969 | 2/1963 | Campbell et al. | 248—358 X |

CHANCELLOR E. HARRIS, *Primary Examiner.*

CLAUDE A. LE ROY, JOHN PETO, *Examiners.*